United States Patent [19]

Yatsuzuka

[11] Patent Number: 5,764,860
[45] Date of Patent: Jun. 9, 1998

[54] LEARNING METHOD FOR MULTI-LEVEL NEURAL NETWORK

[75] Inventor: Youtaro Yatsuzuka, Kanagawa, Japan

[73] Assignee: Kokusai Denshin Denwa Co., Ltd., Tokyo, Japan

[21] Appl. No.: 923,333

[22] Filed: Sep. 4, 1997

Related U.S. Application Data

[63] Continuation of Ser. No. 618,419, Mar. 8, 1996, abandoned.

[30] Foreign Application Priority Data

Mar. 9, 1995 [JP] Japan .................................. 7-077168
Aug. 14, 1995 [JP] Japan .................................. 7-227014

[51] Int. Cl.$^6$ .............................. G06E 1/00; G06F 15/18
[52] U.S. Cl. .................................. 395/23; 395/21; 395/24
[58] Field of Search .............................. 395/20–25, 27; 382/155–161

[56] References Cited

U.S. PATENT DOCUMENTS 5,095,443  3/1992  Watanabe .
5,479,538  12/1995  Takahashi .............................. 382/270
5,481,293  1/1996  Kanno .................................. 347/251

FOREIGN PATENT DOCUMENTS 2-178759  7/1990  Japan .

OTHER PUBLICATIONS

Mori et al. "A Recurrent Neural Network for Short Term Load Forecasting," ANNPS '93. Proc. of the 2nd Intern. Forum on Appl. of Neural Network to Power Systems, p. 395–400, Jan. 31, 1993.

*Primary Examiner*—Tariq R. Hafiz
*Attorney, Agent, or Firm*—Nikaido, Marmelstein, Murray & Oram LLP

[57] ABSTRACT

A learning method supervised by a binary teacher signal for a binary neural network comprises at least an error signal generator 10 for weighting factor updating, which generates an error signal for weighting factor updating having an opposite polarity to that of a difference signal between an output unit signal of the binary neural network and the binary teacher signal on an output unit whereat a binary output unit signal coincides with the binary teacher signal, and an amplitude which decreases by increase of distance from the binary teacher signal, when an absolute value of the difference signal is smaller than a threshold, generates an error signal which has the same polarity as that of the difference signal and an amplitude smaller than that of the difference signal, when the absolute value of the difference signal is larger than the threshold, or generates an error signal which has an amplitude equal to or smaller than that of the difference signal on an output unit providing a wrong binary output unit signal which is different from the binary teacher signal. Updating the weighting factors by the error signal which is optimally generated according to discrimination between the correct binary output unit signal and the wrong one, can provide a binary neural network which converges very quickly and reliably to obtain a desired binary output and also realizes a high generalization ability.

9 Claims, 5 Drawing Sheets

LEARNING METHOD FOR MULTI-LEVEL NEURAL NETWORK

This application is a continuation of application Ser. No. 08/618,419 filed Mar. 8, 1996, now abandoned.

BACKGROUND OF THE INVENTION

The present invention relates to learning methods for multi-level neural networks which are applied to large scale logic circuits, pattern recognizers, associative memories, code converters and image processors, providing a desired output signal stably and quickly by a simple training process with controls of signals in polarity and amplitude for updating weighting factors and a detection of tenacious states trapped in local minima.

One of neural network is a multi-layered neural network, in which a back-propagation algorithm has been widely used as a supervised learning method for the neural network. In a learning process, the difference signal is derived by subtracting an output unit signal of an output layer replying to a training input signal fed in an input layer from a prepared teacher signal T (teacher signal element: T1, T2 . . . . $T_M$) through a subtractor, and the weighting factors between adjacent layers are updated by using the output unit signal and the difference signal to minimize the power of the difference signal. The learning Process using the whole training input signal is repeatedly conducted for updating weighting factors to achieve convergence. In the learning process, a minimum power of the difference signal can provide complete convergence of the neural network in binary space, resulting in coincidence between the multi-level output unit signal for the training input signal and the multi-level teacher signal.

However, when a state minimizing the power of the difference signal is captured once into local minima, global minima cannot be obtained even if the training cycles are increased, or a significantly large number of the training cycles is necessary to obtain the global minima. A dependency on initial conditions of the weighting factors is also one of the problems to achieve quick convergence.

On the other hand, in a multi-layered neural network with a conventional learning method, as shown in FIG. 1, a new teacher signal T' having values of 0.1 and 0.9 has been utilized to improve the convergence speed instead of a teacher signal T having values of 0 and 1, as described in "Parallel Distributed Processing" by D. E. Rumelhart, MIT Press, and the learning process starts to learn after setting initial conditions under the control of the mode controller 9.

The difference signal is obtained by subtracting the output unit signal of a multi-layered neural network 1 for the training input signal fed through a terminal 2 from the teacher signal T' through a subtractor 4, and is fed into a weighting factor controller 5 to update the weighting factors by a back-propagation algorithm and set them again in the multi-layered neural network 1.

A binary output unit signal 23 from the output unit signal through a binary threshold means 6 and the binary teacher signal is also obtained from the teacher signal T' through a binary threshold means 7. By detecting the coincidence between the teacher signal T and the binary output unit signal 23 through a coincidence detector 8, it is judged whether the multi-layered neural network 1 achieved convergence or not. These procedures are repeated in the training process until convergence is achieved.

It has already been noted that the teacher signal T' having values of 0.1 and 0.9 can reduce the necessary number of training cycles for achieving convergence in comparison with the teacher signal T having 0 and 1 in a conventional learning method. This is because the updating speed of the weighting factors becomes slower due to small gradients for input values very close to 0 and 1 in a sigmoidal transfer function.

A speed up in training can therefore be achieved by a larger gradient obtained by setting the teacher signal T' to 0.1 and 0.9. This method cannot however provide a sufficient improvement in convergence as well, because the multi-layered neural network is frequently captured in a very tenacious state trapped in local minima.

Conventional learning methods have the defects that it is very difficult to quickly achieve complete convergence in binary space due to the easy capture of the tenacious state trapped in local minima and the difficulty of slipping away from it, as aforementioned. A design method for achieving reliable convergence has particularly not been established yet for either a three layered or multi-layered neural network having a large amount of input nodes. Only heuristic approaches are conducted by adjusting initial conditions of weighting factors and/or changing the number of hidden units. Easy methods for detecting tenacious states trapped by local minima could not also be found.

If the training process is terminated for the neural network 1 trapped in a state having local minima and the weighting factors are set in the neural network 1 in an execution process, it can provide not only completely correct binary output unit signal for the training input signal, but also a large number of correct binary output signals for a test input signal, resulting in a low generalization ability.

As aforementioned, conventional learning methods for multi-layered neural network with a multi-level teacher signal have disadvantages that either a large number of training cycles for updating the weighting factors is required to achieve a convergent state which provides a desired multi-level output unit signal for the training input signal or a desired multi-level output unit signal cannot be obtained even by continuing the training process due to trapping into tenacious states with local minima, and the convergence speed also severely depends on the initial conditions of weighting factors.

Particularly, an easy design method of multi-level neural network with a large number of input units, a small number of output units and a teacher pattern having a distributed representation, which has a difficulty of complete convergence in binary space, has not been established. Though the use of a large number of hidden units can make the neural network converge, the generalization ability degrades due to a surplus number of hidden units and an over-learning. These approaches inevitably require a huge amount of computations and a very large hardware complexity.

These shortcomings make very difficult to realize multi-level neural networks which can provide complete convergence in multi-level space within a short real time and provide a high generalization ability.

SUMMARY OF THE INVENTION

It is an object, therefore, of the present invention to overcome the disadvantages and limitations of a prior learning method for multi-level neural networks by providing a new and improved learning method.

It is also an object of the present invention to provide a learning method for a multi-level neural network which detects the capture of tenacious states trapped in local minima, and has rapid and reliable convergence within a very small number of training cycles, and also has a high generalization ability.

The multi-level neural networks using the present invention can resolve these problems by achieving a stable convergence 10 to 100 times faster than that of the conventional learning method and also achieve a very high generalization ability.

The multi-level neural network for a new supervised learning process comprises an updating of weighting factors by using an error signal which has either an opposite polarity to that of a difference signal by subtracting the output unit signal from the corresponding teacher signal and an amplitude smaller in proportion to that of the difference, when the absolute value of the difference signal is equal to or smaller than a given threshold for a correct multi-level output unit signal, or has the same polarity as that of the difference signal and an amplitude equal to or smaller than that of the difference signal, when the absolute value is larger than the given threshold for a correct multi-level output unit signal, and also by using an error signal which has the same polarity as that of the difference signal and an amplitude equal to or smaller than that of the difference signal for an erroneous multi-level output unit signal.

A multi-level neural network with another learning method comprises as least a detection of tenacious states trapped in local minima by using at least a minimum absolute value of the difference signals among erroneous binary output unit signals, and an updating of weighting factors by using the error signal adjusted in polarity and amplitude.

A multi-level neural network with yet another learning method comprises at least an updating of weighting factors by using directly the difference signal as the error signal without adjusting the polarity and the amplitude after the neural network for the learning process has converged once.

By using these methods, a tenacious state trapped in local minima can be evaded and also can be easily released even if the state is tightly captured, resulting in quick convergence with a state having global minima within a small number of training cycles.

A tenacious state trapped in local minima can be easily detected when a minimum value of the difference signals among wrong binary output unit signals exceeds a given threshold. Accordingly, by flexibly adjusting the error signal in amplitude, and further, adjusting the detection threshold, quicker convergence can be achieved within a very small number of training cycles. Once the convergence is achieved, an error signal which is the same as the difference signal may be used for updating the weighting factors. When the minimum margin to provide the correct binary output unit signal exceeds a given threshold, the training process can be terminated. This procedure gives a very high generalization ability without over-learning and also with a extremely small dependency on the number of hidden units.

The updating of weighting factors by using the error signal adjusted in polarity and amplitude, the detection of the tenacious state trapped in local minima and the detection of the minimum margin of the correct binary output unit signals can reduce the necessary numbers of hidden units and layers, providing significantly quick convergence without dependency on the initial conditions of weighting factors and a very high generalization ability.

As aforementioned, the invented learning method can easily provide the desired multi-level output unit signal under conditions with very quick and reliable convergence in multi-level space and without dependency on the initial conditions of weighting factors due to the evasion of tenacious states trapped in local minima and easy release from them. After achieving complete convergence in multi-level space once, termination of the learning process by judging with the minimum margin of the correct binary output unit signal can provide a high generalization ability for a large scale multi-level neural network, and can also provide a flexible design freedom in size. Real time logic systems with a learning capability or multi-level logic systems having a large number of inputs can be easily implemented by using these multi-level neural networks. Pattern recognizers, image processors and data converters can also be designed flexibly in cases where a desired output signal cannot be easily obtained by using neural networks with conventional learning methods due to slow and unstable convergence.

BRIEF DESCRIPTION OF THE DRAWINGS

The foregoing and other objects, features, and attendant advantages of the present invention will be appreciated as the same become better understood by means of the following descriptions and accompanying drawings wherein.

DESCRIPTION OF THE PREFERRED EMBODIMENTS

Embodiments of the multi-level neural network according to the present invention are illustrated for structures having only a binary teacher signal in the detailed descriptions given hereafter.

Descriptions of the multi-level neural network are also separately given for the learning and execution processes, respectively.

(Embodiment 1)

Figure 1:
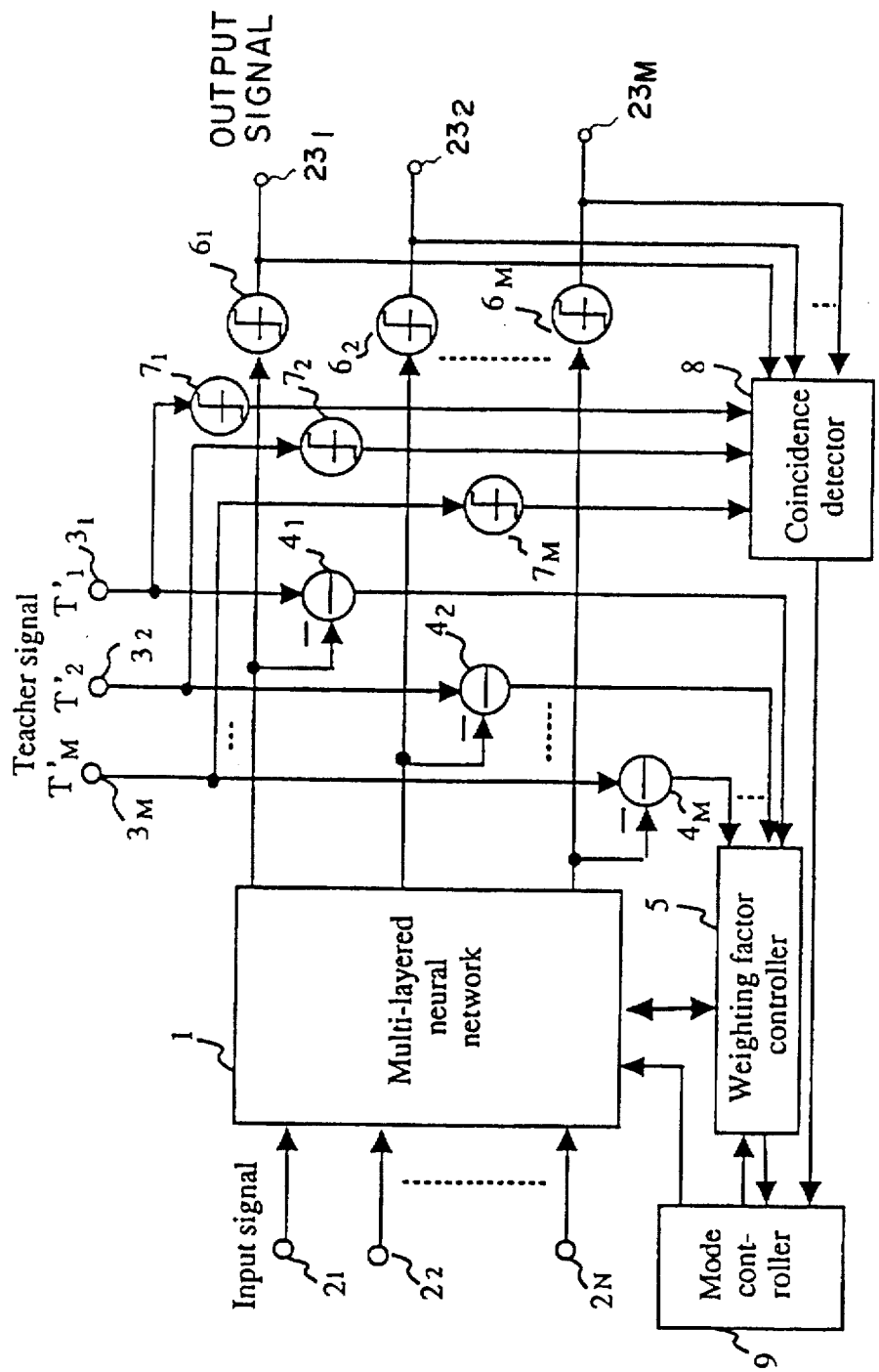
FIG. 1 is a functional diagram of a multi-level neural network with a conventional learning method.
Figure 2:
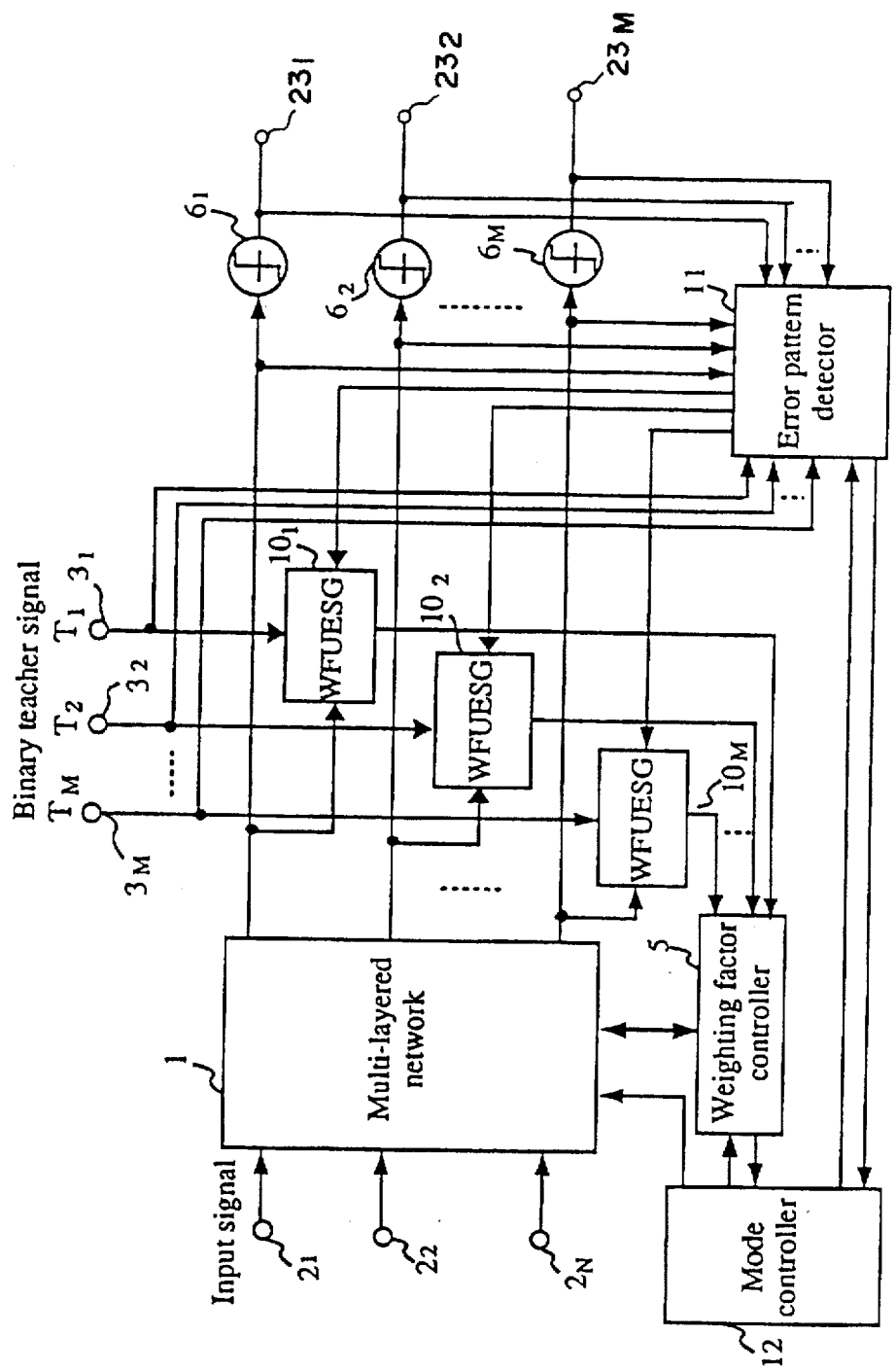
FIG. 2 is a functional diagram of the first embodiment of a multi-level neural network for a learning process, according to this invention.

In a first embodiment of the present invention related to the learning method, a binary neural network for the learning process is provided in FIG. 2, which comprises a multi-layered neural network 1 fed a training input signal through a terminal 2 and providing an output unit signal from an output unit, an error signal generator 10 for weighting factor updating (WFUESG) which generates an error signal by using a binary teacher signal T and an error discrimination signal fed from an error pattern detector 11, binary threshold means 6 which outputs a binary output unit signal 23 converted from an output unit signal, a weighting factor controller 5 which updates the weighting factors in the multi-layered neural network 1 by using the error signals, the error pattern detector 11 which outputs the error discrimination signals indicating whether or not an error in the binary output unit signal 23 on each output unit exists by comparing the binary unit output signal 23 with the corresponding binary teacher signal on each output unit, and a mode controller 12 which sets initial conditions both in the multi-layered neural network 1 and the weighting factor controller 5, and controls the start and termination of the learning process.

Only procedures in the learning process for the binary neural network are described hereafter. The multi-layered neural network 1 learns with the training input signal fed through the terminal 2 and the teacher signal fed through the terminal 3. In the error signal generator 10 (WFUESG), the error signal is generated according to the error discrimination signal from the error pattern detector 11 and the binary teacher signal, and then is fed to the weighting factor controller 5.

On the output unit providing an erroneous binary output unit signal 23, an error signal with an amplitude equal to or smaller than that of the difference signal derived from subtracting the output unit signal from the corresponding teacher signal and the same polarity as that of the difference is generated. On the other hand, on the output unit providing a correct binary output unit signal 23, an error signal with an amplitude smaller in proportion to the distance between the output unit signal and the binary teacher signal and the opposite polarity to that of the difference signal is generated, when the absolute value of the difference signal is equal to or smaller than a given threshold, and further an error signal with an amplitude equal to or smaller than that of the difference signal and the same polarity as that of the difference is generated, when the absolute value of the difference signal is larger than the given threshold.

Error signals are given by the following equations.

If the binary output unit signal on the m-th output unit is correct due to coincidence with the binary teacher signal, and when $|T_m-Y_m| \leq dm$, then $$E_m = T_m - Y_m - D_{m1} * \text{sgn}(T_m - Y_m), \quad (1)$$

and $|T_m - Y_m| > dm$, then $$E_m = T_m - Y_m - D_{m2} * \text{sgn}(T_m - Y_m), \quad (2)$$

If the binary output unit signal on the m-th output unit is wrong due to difference from the binary teacher signal, then $$E_m = T_m - Y_m - D_{m3} * \text{sgn}(T_m - Y_m), \quad (3)$$

where $|z|$ is an absolute value of z, $\text{sgn}(x) = 1$ for $x \geq 0$, $= -1$ for $x < 0$, \quad (4)

m is the m-th location of the output unit ($1 \leq m \leq M$), $E_m$ is the error signal on the m-th output unit, $T_m$ is the binary teacher signal on the mth output unit (0 or 1), $Y_m$ is the output unit signal on the m-th output unit, dm is a threshold on the m-th output unit ($\geq 0$), $D_{m1}$ is a constant defined for the m-th output unit ($D_{m1} \geq dm \geq 0$), $D_{m2}$ is a constant defined for the m-th output unit ($D_{m2} \geq 0$), and $D_{m3}$ is also a constant defined for the m-th output unit ($\geq 0$). The difference signal on the m-th output unit is given by $T_m - Y_m$. Equations (1), (2) and (3) provide an error signal on the m-th output unit with the binary teacher signal $T_m$ and the output unit signal $Y_m$, respectively.

In neural networks handling continuous signals, the same equations can be applied when dm is defined as the convergence region.

The learning procedures are repeated to update the weighting factors by using error signals in the weighting factor controller 5 in order to minimize the power of the difference signal by the back-propagation algorithm, for example. If $Y_m$ is very close to $T_m$ and the absolute value of the difference signal ($T_m - Y_m$) exists in the range of dm on the m-th output unit where no error exists in the binary output unit signal due to coincidence of the binary output unit signal and the binary teacher signal, the error signal has an opposite polarity to the difference signal and an amplitude smaller in proportion to the distance between the binary teacher signal and the output unit signal, as shown in Eq.(1). Outside of this range, the error signal has an amplitude reduced by $D_{m2}$ from that of the difference signal, as shown in Eq.(2).

On the m-th output unit where an error exists in the binary output unit signal, the error signal has an amplitude reduced by $D_{m3}$ from that of the difference signal, as shown in Eq.(3), where $D_m$ has a different value from $D_{m1}$ and $D_{m2}$ and can be 0. As described above, the method for obtaining the error signal is quite different from the conventional method. The weighting factors are updated in the opposite direction from that in the difference signal only when the output unit signal becomes very close to the binary teacher signal, and in other cases are updated in the same direction as that of the difference signal according to the error signal with an amplitude equal to or smaller than that of the difference signal.

This learning method can provide quick convergence with an optimum state within a small number of training cycles due to the evasion of tenacious states trapped in local minima and the easy release from them. A convergence speed 10 times to 100 times faster than that of the conventional methods is reliably obtained, and the numbers of hidden units or hidden layers can be also drastically reduced to converge the binary neural network.

If the network captures a tenacious state trapped in local minima, providing no improvement in error performance, a slight enlargement of amplitude of the error signal can tangibly release and evades the tenacious state by temporarily setting $D_{m1}$ and Dm3 large.

After detecting the achievement of convergence providing full coincidence between the binary teacher signals and the binary output unit signals at the error pattern detector 11, the training process can still be continued with $D_{m1}$ and $D_{m2}$ having smaller values than those before convergence, and finally with values of zero to achieve a high generalization ability, maintaining complete convergence in binary space.

The invented learning method can be also widely applied to neural networks handling continuous signals by preparing ranges of the difference signal in which the output unit signal is considered to converge to the teacher signal.

(Embodiment 2)

In a second embodiment of the present invention related to the learning method, a parallel binary neural network 13 for the learning process is provided in which a main multi-layered neural network 1 and a sub multi-layered neural network 16 connected in parallel are used.

In an execution process, a binary error involved in a binary output unit signal 29 on an output unit of the main neural network 1 is compensated with a binary output unit signal 30 on an output unit of the sub neural network 16 by using a binary modulo add processing. The parallel binary neural network 13 in FIG. 3 operates in a training mode in which weighting factors are updated with a training input signal, and in an execution mode in which the weighting factors learned in the training mode are set and the binary output unit signal is output for an input signal.

Figure 3:
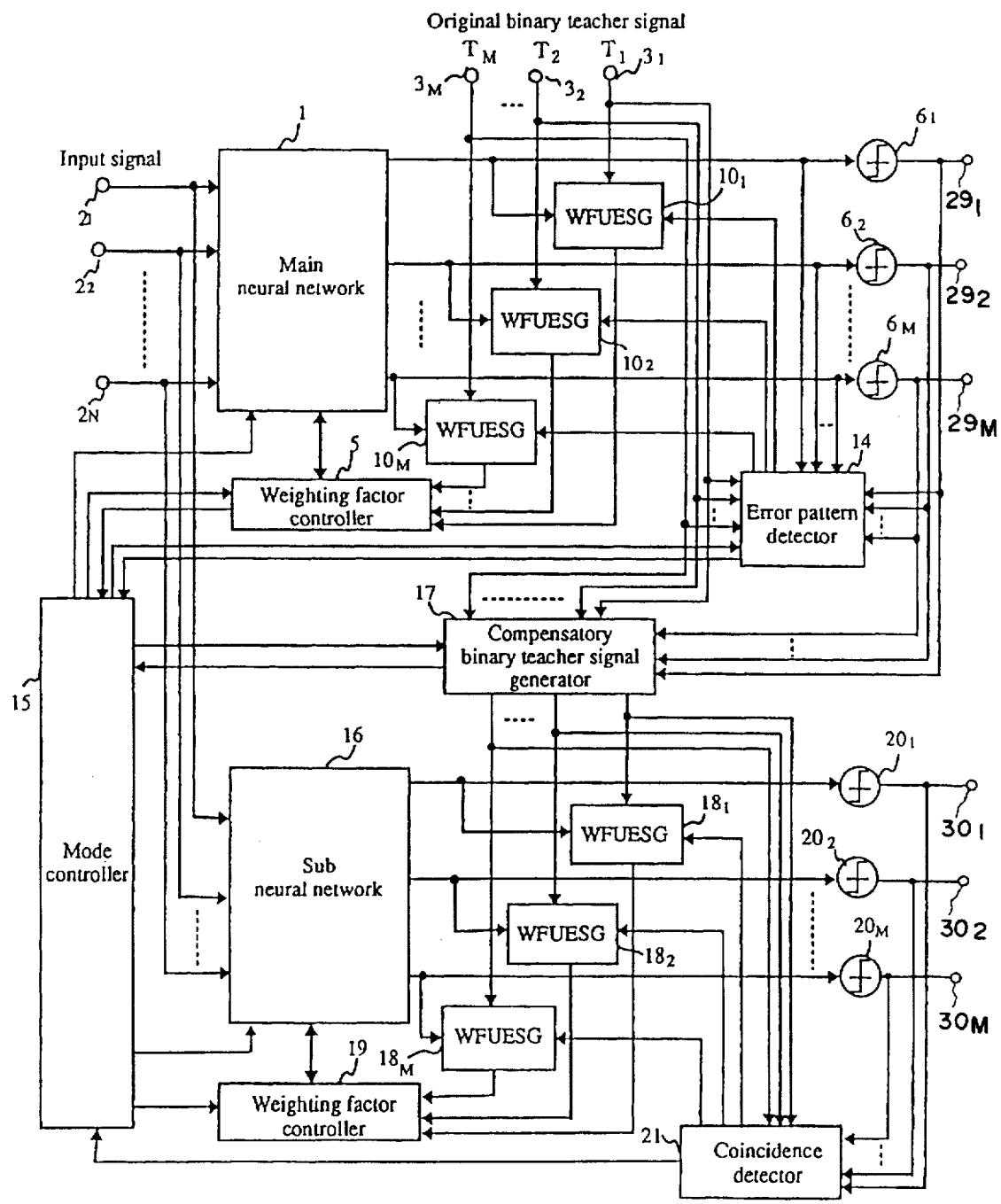
FIG. 3 is a functional diagram of a second embodiment of a parallel binary neural network for a learning process, according to this invention.

Only parallel binary multi-layered neural network 13 is described in detail here. The parallel binary neural network 13 in the learning process with the learning method of the present invention is illustrated in FIG. 3. It comprises the main multi-layered neural network 1, which is trained by using the training input signal fed through a terminal 2 and a main binary teacher signal T, the sub multi-layered neural network 16 which is sequentially trained with the training input signal with a compensatory binary teacher signal Tc derived from a compensatory binary teacher signal generator 17, an error signal generator 10 (WFUESG) in which an error signal is generated by using the output unit signal from the main neural network 1, the corresponding main binary teacher signal T and an error discrimination signal from an error pattern detector 14, an error signal generator 18 (WFUESG) in which an error signal is generated by using the output unit signal of the sub neural network 16, the compensatory binary teacher signal Tc and an error discrimination signal from a coincidence detector 21, weighting factor controllers 5, 19 in which the weighting factors in the main and sub neural networks 1, 16 are updated by, for example, a back-propagation algorithm using the error signals from the WFUESGs 10, 18 to minimize the powers of the difference signals obtained by subtracting the output unit signals from the main binary teacher signal T and the compensatory binary teacher signal Tc, respectively, these factors then being reset in the main and sub neural networks, respectively, binary threshold means 6, 20 in which the output unit signal is converted to the binary output unit signal 29, 30, the error pattern detector 14 in which the error discrimination signal is output by detecting the binary errors between the main binary teacher signal T and the binary output unit signal, the compensatory binary teacher signal generator 17 in which the compensatory binary teacher signal Tc is generated by adding in binary modulo the main binary teacher signal and the binary output unit signal 29, the coincidence detector 21 in which coincidence is detected between the binary output unit signal 30 of the sub neural network 16 and the compensatory binary teacher signal Tc, and the mode controller 15 in which initial conditions and start and termination controls for the learning process are set first for the main neural network 1, and then after generating the compensatory binary teacher signal Tc, initial conditions and start and termination controls for the learning process are also set for the sub neural network 16, and finally the training mode is switched to the execution mode after finishing both the learning processes.

In the WFUESGs 10, 18, the error signals are obtained by Eqs. (1), (2) and (3) as in the first embodiment, and then the weighting factors are updated in the weighting factor controllers 5 and 19. As in the first embodiment, when the output unit signal is very close to the binary teacher signal, the weighting factors are updated in the opposite direction from the polarity of the difference signal. Tenacious states trapped in local minima can be almost evaded to achieve quick convergence within small number of training cycles, rarely can however be maintained under certain conditions. If the number of binary errors detected in the error pattern detector 14 does not decrease by increase of the number of training cycles due to capture of a rigidly stable state trapped in local minima, the amplitude of the error signal having an opposite polarity to that of the difference signal is instantaneously enlarged to release the state in the weighting factor controller 5, 19.

The learning process for the main neural network 1 can be terminated through the weighting factor controller 5 by a method in which the number of binary errors between the binary output unit signal 29 and the main binary teacher signal is compared with a threshold in the error pattern detector 14, a method in which a minimum distance between a decision level of the binary threshold means 6 and the output unit signals among the erroneous binary output signals is compared with a given threshold for detection of the tenacious state trapped in local minima, or a method in which the number of the training cycles is compared with a given threshold.

If all the binary output unit signals 29 of the main neural network 1 are coincident completely with the main binary teacher signals, providing convergence in binary space, it is not necessary for the sub neural network 16 to be trained and the weighting factors may be set to zero.

On the other hand, when the learning process is terminated, if the binary output unit signals 29 have binary errors in comparison with the main binary teacher signals, the compensatory binary teacher signal Tc is generated by using XOR modulo adder and is memorized in the compensatory binary teacher signal generator 17.

After finishing the procedures for the main neural network 1, the controller 15 then starts learning the training input signal by the sub neural network 16.

In the error signal generator 18 (WFUESG), the error signal is generated by using the output unit signal of the sub neural network 16, the compensatory binary teacher signal Tc and the error discrimination signal from the coincidence detector 21, according to Eqs. (1), (2) and (3), and is fed to the weighting factor controller 19 to update the weighting factors for minimizing the power of the difference signal.

The learning process is continued until the full coincidence between the compensatory binary teacher signals and the binary output unit signals 30 is detected in the coincidence detector 21.

In the parallel binary neural network 13 related to the learning method according to the present invention , as aforementioned, it is not necessary for the main binary neural network 1 to converge, if the sub binary neural network 16 completely learns the errors in the binary output unit signal of the main binary neural network 1 as the compensatory binary teacher signal 29 Tc.

The rate of correct binary unit output signals of the main neural network 1 can easily attains a value higher than 95% within an extremely small number of training cycles, and therefore the compensatory binary teacher signal Tc having a small number of clusters also makes the sub neural network 16 converge easily and reliably within a few number of training cycles.

The parallel binary neural network 13 can drastically reduce the number of training cycles so as to achieve complete convergence in binary space without dependency on the initial conditions of the weighting factors, and also provide a very high generalization ability for the input signal in comparison to the conventional neural networks.

Figure 4:
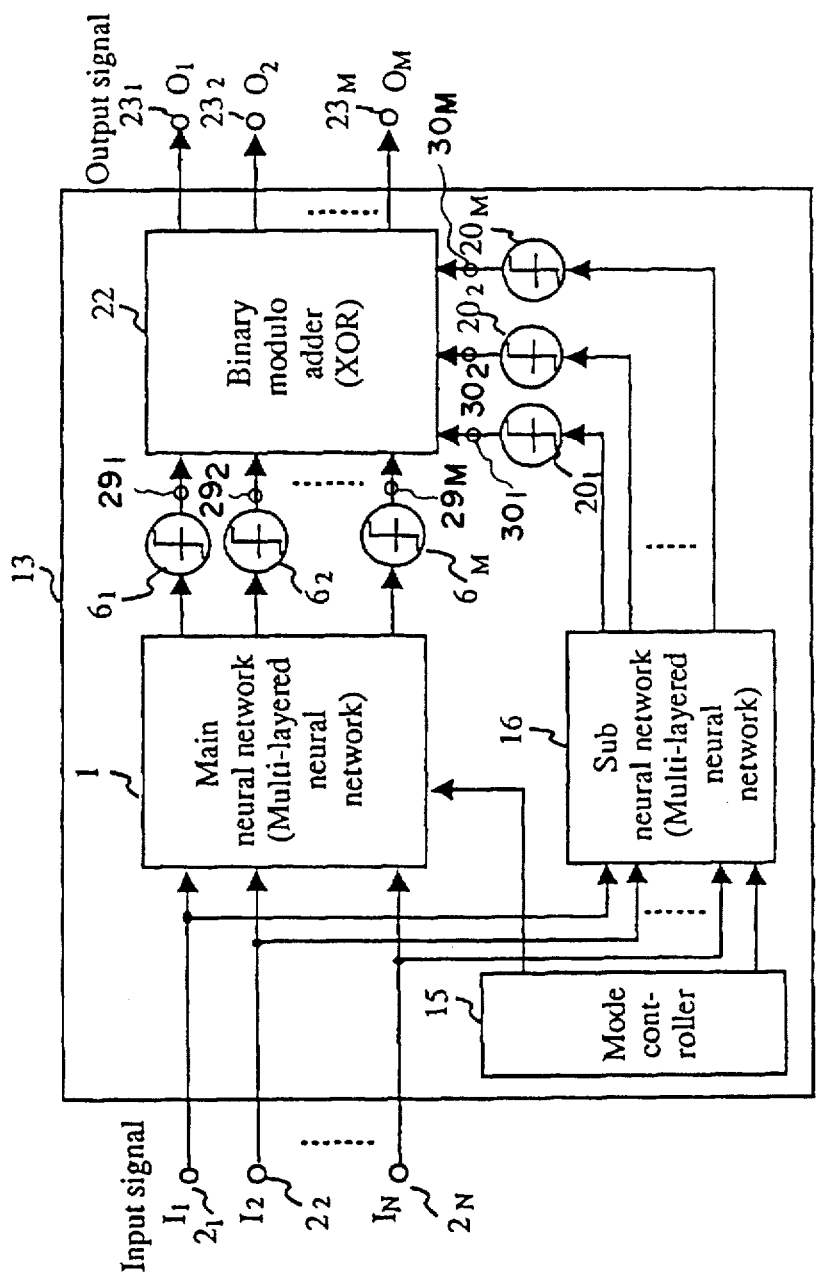
FIG. 4 is a functional diagram of the second embodiment of the parallel binary neural network for an execution process, according to this invention.

The parallel binary neural network 13 in the execution process is illustrated in FIG. 4. It comprises the main neural network 1, the sub neural network 16 in parallel, binary threshold means 6, 20 to output binary output unit signal for the output unit signal, the binary modulo adder 22 to add in modulo the binary unit output signals 29, 30 derived from the binary threshold means 6 and 20, and a mode controller 15 to control the main and sub neural networks 1, 16 for setting the weighting factors obtained in the learning process and performing the execution process.

The binary modulo adder 22 provides a binary output signal 0 of the parallel binary neural network 13 through a terminal 23.

The main binary neural network 1 does not necessarily provide completely provide a desired binary output unit signal 29 without binary errors. The sub binary neural network 16, however, can provide the same binary output unit signals 30 as the binary errors, and these binary errors are corrected completely through the binary modulo adder 22. Therefore, the parallel binary neural network 13 provides the desired binary output signal 0 through the terminal 23 for the training input signal, resulting in complete convergence in binary space for the parallel binary neural network 13.

The compensatory binary teacher signal having a very small number of clusters can in principle provide a high generalization ability superior to that of the main binary neural network 1 and the avoidance of the unnecessary over-learning by the error pattern detector 14 can also expand the generalization ability for the input signal.

For these reasons, a large scale binary neural network can be realized which equivalently provides very quick convergence without dependency on the initial conditions of weighting factors and also a high generalization ability. The non-necessity of complete convergence in binary space of the main binary neural network 1 results in a huge reduction of the number of hidden units and layers and also a reduction of processing accuracy and further amount of calculations in the main and sub neural networks due to the error compensation technique using the binary modulo adder process.

For the expansion to the neural network handling multi-levels more than 2, it is only necessary to utilize a multi-level teacher signal having a number of levels more than 2, multi-level threshold means instead of the binary threshold means 6, 20, a multi-level modulo adder instead of the binary modulo adder 22, and a compensatory multi-level teacher signal generator having a multi-level modulo subtractor in stead of the compensatory binary teacher signal generator 17.

(Embodiment 3)

Figure 5:
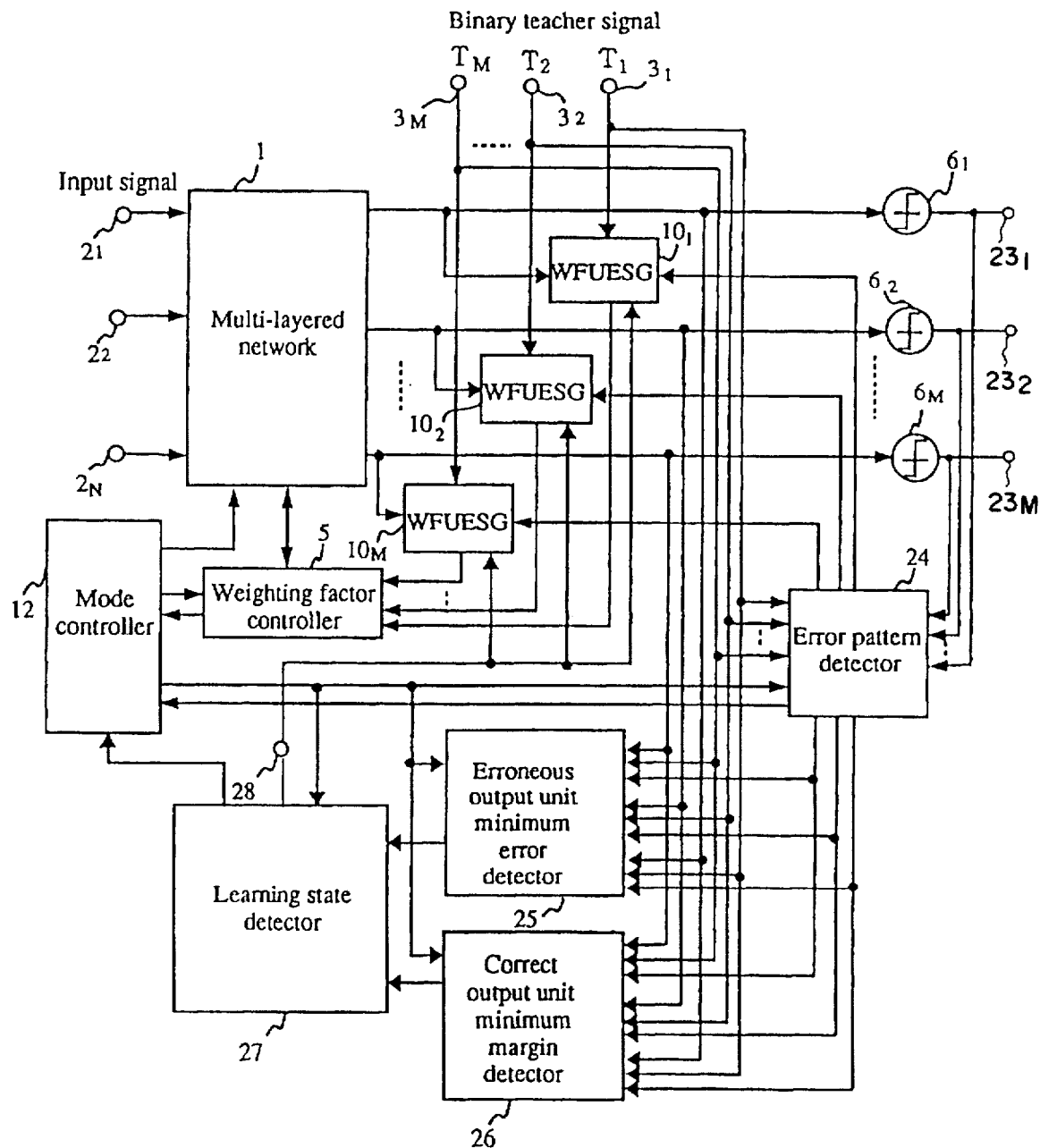
FIG. 5 is a functional diagram of a third embodiment of the multi-level neural network for a learning process, according to this invention.

A binary neural network for the learning process according to the third embodiment of the present invention, is illustrated in FIG. 5. The network comprises a multi-layered neural network 1 in which a training input signal is fed through a terminal 2, an error signal generator 10 (WFUESG) which generates an error signal by using an output unit signal, a binary teacher signal T and an error discrimination signal fed from an error pattern detector 24, binary threshold means 6, a weighting factor controller 5, the error pattern detector 24 which outputs error discrimination signals indicating the existence of errors in binary output unit signals 23 by comparing them to the corresponding binary teacher signals T, an erroneous output unit minimum error detector 25 which detects a minimum absolute value of the differences between the output unit signals and the decision level of the binary threshold means 6 (a minimum error) among the erroneous binary output unit signals, a correct output unit minimum margin detector 26 which detects a minimum absolute value of the differences between the output unit signals and the decision level of the binary threshold means 6 (a minimum margin) among the correct binary output unit signals, a learning state detector 27 in which the capture of the tenacious state trapped in local minima is detected by using the minimum error and a converged state is also detected to monitor both the minimum error and margin of the binary output unit signals, and a mode controller 12 which controls the set of initial conditions of the multi-layered neural network 1, the weighting factor controller 5, error pattern detector 24, an erroneous output unit minimum error detector 25, the correct output unit minimum margin detector 26 and the learning state detector 27 and also controls the start and termination of the learning process.

Only the procedures in the learning process for the binary neural network are described hereafter. The multi-layered neural network 1 learns with the training input signal fed through a terminal 2 and the teacher signal fed through a terminal 3. In the error signal generator 10 (WFUESG), the error signal is generated by using the output unit signal, the teacher signal and the error discrimination signal from the error pattern detector 11, and is fed to the weighting factor controller 5. On the output unit providing a erroneous binary output unit signal, an error signal which has the same polarity as a difference signal derived from subtracting the output unit signal from the corresponding binary teacher signal and an amplitude reduced by $D_{m3}$ from that of the difference signal is generated. On the other hand, on the output units providing a correct binary output unit signal, an error signal having the opposite polarity and an amplitude smaller in proportion to the distance from the binary teacher signal and smaller than Dm1 is generated, when the absolute value of the difference signal is equal to or smaller than a given threshold dm, and an error signal having the same polarity of the difference signal and an amplitude reduced by Dm2 from that of the difference signal is generated, when the absolute value of the difference signal is larger than the given threshold dm.

As the capture of a tenacious state trapped in local minima is detected by the minimum error for the erroneous binary output unit signals exceeding a given threshold in the erroneous output unit minimum error detector 25, the learning state detector 27 outputs a local minima capture signal through a terminal 28. By enlarging Dm1 and $D_{m3}$, furthermore $D_{m2}$ and dm, respectively, according to the local minima capture signal in the WFUESG, the tenacious state trapped in the local minima can be easily released.

When both the minimum error for the erroneous binary output unit signals and the minimum margin for the correct binary output unit signals exceed thresholds, respectively, then fall below them once and exceed them again, a transition between different tenacious states trapped in local minima is recognized in the learning state detector 27.

When the minimum error of the erroneous binary output unit signals becomes close to zero by increase of the number of learning cycles, indicating evasion of the tenacious state trapped in local minima, the learning process can be performed with reduced values of dm, $D_{m1}$, $D_{m2}$ and $D_{m3}$.

After achieving convergence providing full coincidence between the binary output unit signals 23 and the corresponding binary teacher signals once, the learning process may be continued with the further reduced values of dm, $D_{m1}$, $D_{m2}$ and $D_{m3}$, and finally with $D_{m1}$, $D_{m2}$ and $D_{m3}=0$ which means the direct use of the difference signal as the error signal. It is also able to continue the learning process, adjusting a momentum and/or a learning factor simultaneously.

When the minimum margin of the correct binary output unit signals exceeds a given threshold in the learning state detector 27, after achieving complete convergence in binary space, the learning process in the multi-layered neural network 1 can be terminated according to control by the mode controller 12. By this procedure, the multi-layered neural network having a large number of hidden units can provide the highest generalization ability without over-learning in a small number of training cycles, maintaining complete convergence in binary space.

The present invention related to the learning method can also be widely applied to neural networks handling continuous signals by preparing ranges in which the output unit signal is considered to correctly converge to the teacher signal. Though detailed descriptions were given only for the multi-layered neural network, this invention can be applied to other neural networks with teacher signals.

As aforementioned, there is almost no capture of a tenacious state trapped in local minima by using the invented learning method. Even if the state is detected in the learning state detector 27 by using the minimum error of the wrong binary output unit signals or by using the minimum margin of the correct binary output unit signals, the adjustment of the polarity and amplitude of the error signal for the correct binary output unit signal or the adjustment of the amplitude of the error signal for the wrong binary output unit signal can easily evade the tenacious state having local minima and and also release it, if captured.

After achieving complete convergence in binary space once, Dm1 and $D_{m2}=0$ are set for the learning process, and the termination of the learning process when the minimum margin of the correct binary output unit signals exceeds the given threshold gives a extremely high generalization ability for test input signals without over-learning for wide range of number of hidden units. Accordingly, The binary neural network with smaller sizes of hardware complexity and calculation in the necessary numbers of hidden units and layers can realize reliable convergence 10 to 100 times faster than that in the conventional learning method and an extremely generalization performance .

The advantages of the present invention will now be summarized.

In a multi-level neural network or a parallel multi-level neural network according to the present invention related to a learning method, quick and reliable convergence without dependence on initial conditions of weighting factors having small bits is achieved for smaller numbers of hidden units and layers, in comparison to conventional learning methods.

A multi-level neural network according to present invention related to the learning method can be easily and flexibly designed to realize large scale multi-level logic circuits which are difficult for conventional methods, can also be widely applied to neural networks for artificial intelligence systems, information retrieval systems, pattern recognitions, data conversions, data compressions and multi-level image processings in which complete and quick convergence and a very high generalization ability are necessary, and is furthermore applicable to communication systems.

From the foregoing it is apparent that a new and improved learning method for neural networks has been found. It should be understood of course that the embodiments disclosed are merely illustrative and are not intended to limit the scope of the invention. Reference should be made to the appended claims, therefore, for indicating the scope of the invention.

What is claimed is:

1. A neural network having a learning method supervised by a teacher signal, said neural network comprising:

a neural network having input means for inputting at least one input signal, output means for outputting at least one output unit signal for controlling a device, reach output unit signal being obtained from the input signals at least through weighting factors;

means for generating a first error signal for updating said weighting factors of said neural network, wherein said first error signal has an opposite polarity to that of a difference signal between an output unit signal of said neural network and said teacher signal, and an amplitude which decreases accordance to a distance from said teacher signal, when an absolute value of said difference signal is smaller than a first threshold, means for generating a second error signal for updating said weighting factors, wherein said second error signal has the same polarity as that of said difference signal and an amplitude smaller than that of said difference signal, when said absolute value of said difference signal is in a range between said first threshold and a second threshold, means for generating a third error signal for updating said weighting factors, wherein said third error signal has an amplitude equal to or smaller than that of said difference signal, when said absolute value of said difference signal is larger than said second threshold, and means for updating said weighting factors by using said first, second, and third error signals.

2. A multi-level neural network having a learning method supervised by a multi-level teacher signal, said multi-level neural network comprising:

a multi-level neural network having input means for inputting at least one input signal, output means for outputting at least one output unit signal for controlling a device each output unit signal being obtained from the input signals at least through weighting factors;

means for generating a first error signal for updating said weighting factors of said multi-level neural network, wherein said first error signal has an opposite polarity to that of a difference signal between an output unit signal of said multi-level neural network and said multi-level teacher signal on an output unit whereat a multi-level output unit signal derived from said output unit signal through multi-level threshold means coincides with said multi-level teacher signal, and an amplitude which decreases according to a distance from said multi-level teacher signal, when an absolute value of said difference signal is smaller than a threshold, means for generating a second error signal for updating said weighting factors, wherein said second error signal has the same polarity as that of said difference signal on said output unit and an amplitude smaller than that of said difference signal, when said absolute value of said difference signal is larger than said threshold, means for generating a third error signal for updating said weighting factors, wherein said third error signal has an amplitude equal to or smaller than that of said difference signal on an output unit whereat said multi-level output unit signal is different from said multi-level teacher signal, and means for updating said weighting factors by using said first, second, and third error signals.

3. A multi-level neural network according to claim 2, wherein:

said weighting factors are updated by using said error signal whereof the amplitude of said error signal is controlled by detection of states trapped in local minima.

4. A multi-level neural network according to claim 3, wherein:

said amplitude of said error signal having said opposite polarity is temporarily increased, when the number of errors in said multi-level output unit signals caused by the difference from said multi-level teacher signal cannot be made to decrease in spite of increase of the number of training cycles.

5. A multi-level neural network according to claim 3, wherein:
   said amplitude of said error signal is controlled with detection of states trapped in local minima by comparison of the minimum absolute value of said difference signals among erroneous multi-level output unit signals with a threshold.

6. A multi-level neural network according to claim 5, wherein:
   said weighting factors are updated by said error signal whereof the amplitude of said error signal is controlled with detection of states trapped in local minima by comparison of the minimum difference between said output unit signals and a decision level of said multi-level threshold means among correct multi-level output unit signals with a threshold.

7. A multi-level neural network according to one of claims 2 to 6 wherein said neural network further comprising a main neural network and a sub neural network coupled parallel with said main neural network wherein:
   said main neural network is trained first by using said multi-value teacher signal,
   said sub neural network is trained next by using a compensatory multi-level teacher signal consisting of errors between a multi-level output unit signal of said main neural network derived through said multi-level threshold means and said multi-level teacher signal.
   updating operation of said weighting factors for said main neural network is terminated, when the minimum difference between said output unit signals and said decision level of said multi-level threshold means among erroneous multi-level output unit signals of said main neural network, exceeds a predetermined threshold.

8. A neural network according to one of claims 1 to 6, wherein:
   after said neural network has converged once by said training input signal such that all multi-level output unit signals coincide with said multi-level teacher signals, updating said weighting factors by using said difference signal as said error signal is continued until conditions of termination of learning are satisfied.

9. A multi-level neural network according to one of claims 2 to 6, wherein:
   after said multi-level neural networks converged once for said training input signal such that all multi-level output unit signals coincide with said multi-level teacher signals, updating of weighting factors is continued until the minimum difference with said output unit signals and said multi-level threshold of said multi-level threshold means among correct multi-level output unit signals, exceeds a threshold.

* * * * *